United States Patent [19]

Stewart

[11] Patent Number: 5,206,291
[45] Date of Patent: Apr. 27, 1993

[54] POLYMER COMPOSITIONS HAVING IMPROVED IMPACT STRENGTH

[75] Inventor: Mark E. Stewart, Kingsport, Tenn.

[73] Assignee: Eastman Kodak Company, Rochester, N.Y.

[21] Appl. No.: 720,051

[22] Filed: Jun. 24, 1991

Related U.S. Application Data

[63] Continuation-in-part of Ser. No. 632,672, Dec. 24, 1990, abandoned.

[51] Int. Cl.⁵ .............................................. C08L 67/02
[52] U.S. Cl. ................................... 525/173; 525/176
[58] Field of Search ............................... 525/173, 176

[56] References Cited

U.S. PATENT DOCUMENTS

| | | | |
|---|---|---|---|
| 4,172,859 | 10/1979 | Epstein | 525/109 |
| 4,284,540 | 8/1981 | Iida et al. | 260/22 R |
| 4,753,980 | 6/1988 | Deyrup | 525/173 |

*Primary Examiner*—Patricia A. Short
*Attorney, Agent, or Firm*—John F. Stevens; William P. Heath, Jr.

[57] ABSTRACT

Disclosed are polymer compositions having improved impact strength, comprising copolyesters of terephthalic acid, ethylene glycol and 1,4-cyclohexanedimethanol with epoxy functional polyolefins.

3 Claims, No Drawings

POLYMER COMPOSITIONS HAVING IMPROVED IMPACT STRENGTH

This application is a continuation in part of our copending U.S. Pat. No. 07/632,672 filed Dec. 24, 1990, now abandoned.

TECHNICAL FIELD

The present invention relates to polymer compositions having improved impact strength, especially at low temperatures. The compositions comprise copolyesters of terephthalic acid, ethylene glycol and 1,4-cyclohexanedimethanol, and epoxy functional polyolefins. The compositions are especially useful as molding compositions.

BACKGROUND OF THE INVENTION

Copolyesters containing 1,4-cyclohexanedimethanol (CHDM) are useful materials for injection molding and extrusion. For many applications these polymers have sufficient toughness but there is a need for further improvements in toughness, especially at low temperatures.

The use of epoxy modified polymers in blends with polyesters such as polyethylene terephthalate (PET) and polybutylene terephthalate (PBT) is known. An ethylene/ethylacrylate/glycidylmethacrylate copolymer blended with PBT was reported by M. Hert, J. C. Jannet and P. Robert (Sixth Annual Meeting of the Polymer Processing Society, Apr. 7-20, 1990). There are no known references Which disclose the specific, unexpected effectiveness of epoxy modified polyolefins in CHDM-containing copolyesters, however.

This invention relates to a class of polyolefin compounds containing reactive epoxy groups which are unexpectedly efficient in increasing the low temperature impact strength of CHDM containing copolyesters.

DESCRIPTION OF THE INVENTION

According to the present invention, there are provided molding compositions having improved impact strength at low temperatures comprising a) about 60–98 wt % of a copolyester consisting essentially of repeat units from terephthalic acid, ethylene glycol and 1,4-cyclohexane dimethanol wherein the mole ratio of ethylene glycol to 1,4-cyclohexanedimethanol is from 2:98 to 98:2, said copolyester having an I.V. of about 0.3 to 1.0, and b) about 2 40 wt % of an epoxy functional polyolefin having an average of about 1 to about 100 epoxy groups per polymer chain based on the number average molecular weight of said polyolefin.

The copolyesters used in the compositions of the present invention are commercially available or may be prepared using conventional polycondensation procedures. The copolyesters may be modified with insignificant quantities of conventional dicarboxylic acids and glycols. It is required, however, that the copolyesters contain at least 2 mol % 1,4-cyclohexanedimethanol but not more than 98 mol %.

The epoxy functional polyolefins used in the compositions of the present invention are formed from an α-olefin of 2 to 6 carbon atoms. Ethylene and propylene are preferred. The epoxy functional monomer copolymerized with the α-olefin is selected from one of the following:

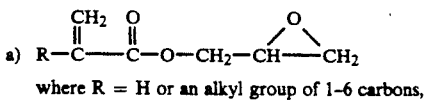

where R = H or an alkyl group of 1–6 carbons,

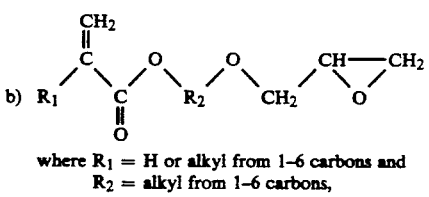

where $R_1$ = H or alkyl from 1–6 carbons and
$R_2$ = alkyl from 1–6 carbons,

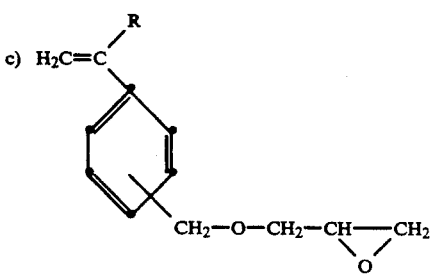

where R = H or alkyl from 1–6 carbons,

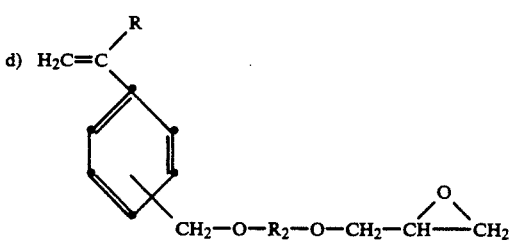

where $R_1$ = H or alkyl from 1–6 carbons,
and $R_2$ = alkyl from 1–6 carbons, and

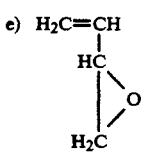

Preferably, the epoxy containing monomer is selected from glycidyl methacrylate and glycidyl acrylate.

The epoxy functional polyolefin contains about 0.5–10 mol % of the epoxy containing monomer. Such epoxy functional polyolefins are commercially available as will be illustrated in the examples. They may also be prepared by conventional polymerization procedures well known in the art.

The blends are compounded in the melt, for example by using a single screw or twin screw extruder. Additional components such as stabilizers, fillers, flame retardants, colorants, lubricants, release agents and the like may also be incorporated into the formulation. It is also permissible to extend the epoxy-modified polyolefin by pre blending it with polyolefins or modified polyolefins.

The following examples are submitted for a better understanding of the invention. In the examples, the following components are used in the compositions:

Copolyester A — Repeat units from 100 mol % terephthalic acid, about 65–75 mol % ethylene glycol and about 35–25 mol % 1,4-cyclohexanedimethanol; I.V. =0.75.

Copolyester B — Repeat units from 100 mol % terephthalic acid, about 60-65 mol % 1,4-cyclohexanedimethanol, and about 40-35 mol % ethylene glycol; I.V. =0.75.

Copolyester C — Repeat units from 100 mol % terephthalic acid, 80-85 mol % 1,4 cyclohexane-dimethanol and 20-15 mol % ethylene glycol; I.V. =0.77.

Copolyester D — Repeat units from 100 mol % terephthalic acid, 96.5 mol % ethylene glycol and 3.5 mol % 1,4-cyclohexanedimethanol; I.V. =0.75.

The following polyolefins are used:

Igetabond 2C epoxy functional polyolefin a product of Sumitomo Chemical Company. Ethylene/glycidyl methacrylate copolymer containing 1,2 mol % glycidyl methacrylate (GMA). Weight average molecular weight is 123,000; Mw/Mn 6.0. Melt index =3.0 g/10 min. Approximately 10 GMA groups per chain.

Igetabond E epoxy functional polyolefin — ethylene/glycidyl methacrylate copolymer containing 2.6 mol % GMA. Mw =123,000; Mw/Mn =5.6. Melt index =3.0 g/10 min. Approximately 20 GMA groups per chain.

Elvax 760 ethylene/vinyl acetate (EVA) copolymer —vinyl acetate concentration 9.3 wt % (3.3 mol %); Melt Index =2.0 g/10 min. (Comparative)

Polyethylene (PE) — Tenite 1550 low density polyethylene. (Comparative)

EXAMPLE 1

Copolyester B is blended with 10, 20 and 30 percent by weight of Igetabond 2C and Igetabond E. The blends are extrusion compounded at 260° C. and injection molded at 265° C. The data are shown in Table 1. The copolyester B control sample (no epoxy functional polyolefin) has very high notched Izod impact strength at 23° C., but the value at 0° C. is low. Unexpectedly, the impact strength at 0° C. is raised to high values by incorporating the epoxy modified polyolefins.

EXAMPLE 2 (Comparative)

Copolyester B is blended with 10, 20 and 30 percent by weight of two other polyolefins, EVA and PE. EVA is a modified polyethylene, but it does not contain epoxy modification. PE is an unmodified polyethylene. Samples are compounded at 260° C. and injection molded at 265° C. Data are shown in Table 2. These polyolefins are ineffective in increasing the low temperature (0° C.) notched Izod impact strength, demonstrating that it is the epoxy functionality of the modified polyolefins in Example 1 which yield the unexpected results.

EXAMPLE 3

Copolyester A is blended with the epoxy functional polyolefins as in Example 1, except using a compounding temperature of 250° C. and a molding temperature of 260° C. The data are shown in Table 3. Again, increases in notched Izod impact strength at 0° C. are evident as the epoxy functional polyolefins are added.

EXAMPLE 4 (Comparative)

Copolyester A is blended with 10, 20 and 30 percent by weight of EVA and PE as in Example 2, except using the processing conditions of Example 3. Results are shown in Table 4. Again, these polyolefins are ineffective in raising the notched Izod at 0° C.

EXAMPLE 5

Copolyester C is compounded with 5, 10, 20 and 30 wt % Igetabond E epoxy functional polyolefins, then injection molded using a 270° C. set temperature. Izod impact strengths are determined at 0° C. and are shown in Table 5. The unexpectedly high impact strength values found for the other copolyesters are also obtained with this copolyester composition.

EXAMPLE 6

In this example, Igetabond 2C epoxy functional polyolefin is pre-blended with (a) EVA and (b) PE in a 50/50 ratio. This blend is then compounded with copolyester B at 10 wt %. Again, high impact strengths at 0° C. are obtained: 19.6 ft-lb/in. for Sample 6a and 17.9 ft-lb/in. for Sample 6b. This example illustrates that the epoxy modified polyolefin can be extended with other polyolefins which are outside the scope of this invention and still maintain surprisingly high low temperature impact strength.

EXAMPLE 7

Igetabond 2C epoxy functional polyolefin is blended into copolyester B at a 5 wt % level. Five notched Izod impact specimens are tested at 0° C., yielding an unexpectedly high average impact strength of 6.9 ft-lb/in.

These blends are useful in applications where good toughness over a range of temperatures is needed. Examples are injection molded parts, especially in areas such as appliance components, automotive, safety devices, and recreational vehicles.

TABLE 1

| Copolyester B | | | | | | |
|---|---|---|---|---|---|---|
| % Epoxy Functional Polyolefin | | | | | | |
| | | 10 | | 20 | | 30 |
| | | Igetabond Type | | | | |
| | 0 | 2C | E | 2C | E | 2C | E |
| Notched Izod, ft-lb/inc. | | | | | | | |
| 23° C. | 27.2 | 21.1 | 20.9 | 17.6 | 17.0 | 18.4 | 18.8 |
| 0° C. | 1.5 | 18.5 | 20.7 | 16.1 | 17.4 | 20.3 | 19.1 |

TABLE 2

| Copolyester B | | | | | | |
|---|---|---|---|---|---|---|
| % Polyolefin | | | | | | |
| | | 10 | | 20 | | 30 |
| | | Polyolefin Type | | | | |
| | 0 | EVA | PE | EVA | PE | EVA | PE |
| Notched Izod, ft-lb/in. | | | | | | | |
| 23° C. | 27.2 | 18.6 | 4.0 | 13.1 | 2.2 | 2.3 | 2.8 |
| 0° C. | 1.5 | 1.9 | 2.2 | 1.2 | 1.2 | 1.2 | 1.7 |

TABLE 3

| Copolyester A | | | | | | |
|---|---|---|---|---|---|---|
| % Epoxy Functional Polyolefin | | | | | | |
| | | 10 | | 20 | | 30 |
| | | Igetabond Type | | | | |
| | 0 | 2C | E | 2C | E | 2C | E |
| Notched Izod, ft-lb/in. | | | | | | | |
| 23° C. | 1.9 | 6.9 | 15.0 | 2.0 | 18.4 | 14.7 | 19.6 |
| 0° C. | 1.1 | 2.3 | 2.9 | 1.8 | 9.5 | 7.3 | 17.1 |

TABLE 4

Copolyester A

| | | % Polyolefin | | | | |
| --- | --- | --- | --- | --- | --- | --- |
| | | 10 | | 20 | | 30 |
| | | Polyolefin Type | | | | |
| | 0 | EVA | PE | EVA | PE | EVA | PE |
| Notched Izod, ft-lb/in. | | | | | | | |
| 23° C. | 1.9 | 0.3 | 0.2 | 1.8 | 1.2 | 1.7 | 1.9 |
| 0° C. | 1.1 | 1.4 | 1.0 | 1.1 | 0.8 | 1.2 | 1.2 |

TABLE 5

Copolyester C

| | % Igetabond E Polyolefin | | | | |
| --- | --- | --- | --- | --- | --- |
| | 0 | 5 | 10 | 20 | 30 |
| Notched Izod, ft-lb/in. | | | | | |
| 0° C. | 2.3 | 3.7 | 18.4 | 17.3 | 17.2 |

In the following Examples 8 and 9, homopolyesters rather than copolymers are used. They are described as follows:

Homopolyester A — Repeat units from 100 mol % terephthalic acid and 100 mol % ethylene glycol. I.V. =0.72. (Comparative)

Homopolyester B — Repeat units from 100 mol % terephthalic acid and 100 mol % 1,4-cyclo-hexanedimethanol. I.V. =0.75. (Comparative)

EXAMPLE 8 (Comparative)

Homopolyester A is blended with 10, 20 and 30 weight percent of Igetabond 2C and Igetabond E epoxy functional polyolefins. The blends are extrusion compounded at 270° C. and injection molded at 275° C. The 0° C. impact data are presented in Table 6. The impact strength of this material is not substantially affected by the addition of the epoxy modified polyolefin.

EXAMPLE 9 (Comparative)

Homopolyester B is blended with 10, 20 and 30 weight percent of Igetabond 2C and Igetabond E epoxy functional polyolefins. The blends are extrusion compounded at 310° C. and injection molded at 310° C. The 0° C. impact data are presented in Table 7. Once again, the impact strength of this material is relatively unaffected by the addition of the epoxy modified polyolefin. Examples 8 and 9 clearly demonstrate that blends of PET and PCT homopolyesters with epoxy modified polyolefins do not exhibit the unobviously high low temperature impact strength observed for blends of their copolyesters with epoxy modified polyolefins.

TABLE 6

Homopolyester A

| | % Epoxy Functional Polyolefin | | | | | |
| --- | --- | --- | --- | --- | --- | --- |
| | | 10 | | 20 | | 30 |
| | | Igetabond Type | | | | |
| | 0 | 2C | E | 2C | E | 2C | E |
| Notched Izod, ft-lb/in. | | | | | | | |
| 0° C. | 0.9 | 1.2 | 2.0 | 1.1 | 1.0 | 1.4 | 2.2 |

TABLE 7

Homopolyester B

% Epoxy Functional Polyolefin

TABLE 7-continued

| | | 10 | | 20 | | 30 |
| --- | --- | --- | --- | --- | --- | --- |
| | | Igetabond Type | | | | |
| | 0 | 2C | E | 2C | E | 2C | E |
| Notched Izod, ft-lb/in. | | | | | | | |
| 0° C. | 0.7 | 0.4 | 0.9 | 0.8 | 0.8 | 0.9 | 0.9 |

EXAMPLE 10

Copolyester D is blended with 10, 20 and 30 weight percent of Igetabond E epoxy functional polyolefin. The blends are extrusion compounded at 270° C. and injection molded at 285° C. The 0° C. impact data are presented in Table 8. The surprisingly high impact strengths observed for other copolyester compositions are also obtained with this copolyester, even though it contains only 3.5 mol % 1,4-cyclohexanedimethanol.

TABLE 8

Copolyester D

| | Epoxy Functional Polyolefin | | | |
| --- | --- | --- | --- | --- |
| | | 10 | 20 | 30 |
| | | Igetabond | | |
| | 0 | E | E | E |
| Notched Izod, ft-lb/in. | | | | |
| 0° C. | 0.8 | 2.0 | 7.4 | 18.1 |

In the examples, impact strength is measured according to ASTM D256, except that 5 specimens were tested instead of the 10 specified in the test method.

As used herein, the inherent viscosity (I.V.) is measured at 25° C. using 0.50 g of polymer per 100 mL of a solvent consisting of 60% by weight phenol and 40% by weight tetrachloroethane.

The invention has been described in detail with particular reference to preferred embodiments thereof, but it will be understood that variations and modifications can be effected within the spirit and scope of the invention.

I claim:

1. Molding compositions having improved impact strength at low temperatures comprising
    a) about 60–98 wt % of a copolyester consisting essentially of repeat units from terephthalic acid, ethylene glycol and 1,4-cyclohexanedimethanol wherein the mole ratio of ethylene glycol to 1,4-cyclohexane-dimethanol is from 2:98 to 98:2, said copolyester having an I.V. of about 0.3 to 1.0, and about 2–40 wt % of an epoxy functional polyolefin having an average of about 1 to about 100 epoxy groups per polymer chain based on the number average molecular weight of said polyolefin, said polyolefin consisting essentially of repeat units of α-olefins at 2–6 carbon atoms and repeat units from at least one epoxy functional monomer selected from

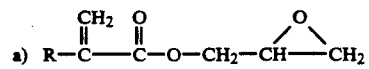

where R = H or an alkyl group of 1–6 carbons, b) 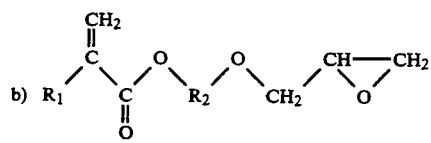

where $R_1$ = H or alkyl from 1-6 carbons and
$R_2$ = alkyl from 1-6 carbons, c) 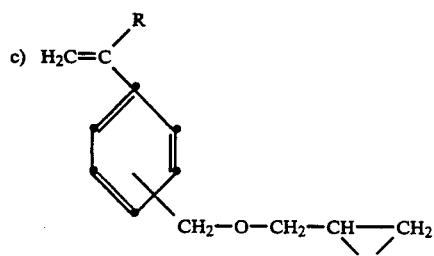

where R = H or alkyl from 1-6 carbons, d) 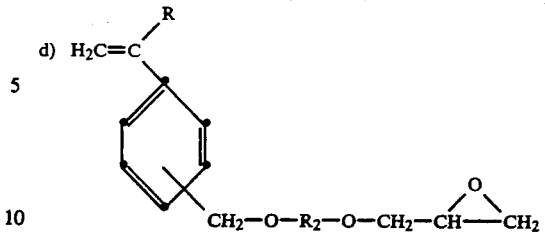

where $R_1$ = H or alkyl from 1-6 carbons,
and $R_2$ = alkyl from 1-6 carbons, and e) 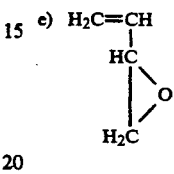

2. Molding composition according to claim 1 wherein said epoxy functional monomer is selected from glycidyl methacrylate and glycidyl acrylate.

3. Molding composition according to claim 1 wherein the epoxy functional polyolefin is an ethylene-glycidyl methacrylate copolymer.

* * * * *